US011521133B2

(12) United States Patent
Martin-Maroto (10) Patent No.: US 11,521,133 B2
(45) Date of Patent: Dec. 6, 2022

(54) METHOD FOR LARGE-SCALE DISTRIBUTED MACHINE LEARNING USING FORMAL KNOWLEDGE AND TRAINING DATA (71) Applicant: Fernando Martin-Maroto, Santa Cruz, CA (US)

(72) Inventor: Fernando Martin-Maroto, Santa Cruz, CA (US)

( * ) Notice: Subject to any disclaimer, the term of this patent is extended or adjusted under 35 U.S.C. 154(b) by 721 days.

(21) Appl. No.: 16/480,625

(22) PCT Filed: Jan. 17, 2019

(86) PCT No.: PCT/US2019/013941
§ 371 (c)(1),
(2) Date: Jul. 24, 2019

(87) PCT Pub. No.: WO2019/143774
PCT Pub. Date: Jul. 25, 2019

(65) Prior Publication Data
US 2019/0385087 A1    Dec. 19, 2019

Related U.S. Application Data

(60) Provisional application No. 62/618,920, filed on Jan. 18, 2018.

(51) Int. Cl.
*G06N 5/04*      (2006.01)
*G06N 20/20*     (2019.01)
(52) U.S. Cl.
CPC ............. *G06N 20/20* (2019.01); *G06N 5/043* (2013.01)

(58) Field of Classification Search
CPC .............................. G06N 20/20; G06N 5/043
USPC ........................................................... 706/12
See application file for complete search history.

(56) References Cited

U.S. PATENT DOCUMENTS

| 2014/0067738 A1 | 3/2014 | Kingsbury |
| 2016/0291942 A1 | 10/2016 | Hutchison |
| 2017/0031982 A1 | 2/2017 | Johnston et al. |

(Continued)

OTHER PUBLICATIONS

Li et al ("Parameter Server for Distributed Machine Learning" 2013) (Year: 2013).*

(Continued)

*Primary Examiner* — Lut Wong
(74) *Attorney, Agent, or Firm* — Haynes Beffel & Wolfeld LLP; Ernest J. Beffel, Jr.; Korbin S Van Dyke (57) ABSTRACT

A method for large-scale distributed machine learning using input data comprising formal knowledge and/or training data. The method consisting of independently calculating discrete algebraic models of the input data in one or many computing devices, and in sharing indecomposable components of the algebraic models among the computing devices without constraints on when or on how many times the sharing needs to happen. The method uses an asynchronous communication among machines or computing threads, each working in the same or related learning tasks. Each computing device improves its algebraic model every time it receives new input data or the sharing from other computing devices, thereby providing a solution to the scaling-up problem of machine learning systems.

13 Claims, 6 Drawing Sheets

(56) References Cited

U.S. PATENT DOCUMENTS

2018/0006898 A1    1/2018   Kanza et al.
2019/0385087 A1   12/2019   Martin-Maroto

OTHER PUBLICATIONS

Costa et al ("Indecomposable Baric Algebras" 1993) (Year: 1993).*
Jerry Swan ("Harmonic Analysis and Resynthesis of Sliding-Tile Puzzle Heuristics" 2017) (Year: 2017).*
Seshadri et al., In-DRAM Bulk Bitwise Execution Engine, arXiv. 1905.09822v3 [cs.AR] Apr. 5, 2020, 45 pgs.
Li et al., "Pinatubo: A processing-in-memory architecture for bulk bitwise operations in emerging non-volatile memories," Design Automation Conference (DAC), Jun. 5, 2016, 6 pgs.
Seshadri et al., "RowClone: Fast and energy-efficient in-DRAM bulk data copy and initialization", Micro-46, 7 Dec. 7, 2013, 13 pgs.
Seshadri et al, Ambit: In-Memory Accelerator for Bulk Bitwise Operations Using Commodity DRAM Technology, Micro-50, 14 Oct. 14, 2017.
Seshadri et al., Fast Bulk Bitwise AND and OR in DRAM, IEEE Computer Architecture Letters 14, 2015, 4 pgs.

* cited by examiner

METHOD FOR LARGE-SCALE DISTRIBUTED MACHINE LEARNING USING FORMAL KNOWLEDGE AND TRAINING DATA

FIELD OF THE INVENTION

This invention generally relates generally to machine learning, and more specifically to machine learning based on discrete algebraic methods. The invention also relates to the cooperation, parallelization and scaling-up of machine learning systems.

BACKGROUND OF THE INVENTION

Methods of symbolic manipulation have played an important role in Artificial Intelligence (AI). These systems encode the user's formal knowledge into a symbolic representation and a set of rules that are applied to obtain the desired output, for example in the form 'if a condition holds, then act'. Symbolic methods have a very long history, from the Aristotelian logic to the large expert systems of the 1980s. Symbolic manipulation methods are transparent, human readable and have been used to mimic human cognitive abilities. They are still an active area of research in information systems, for example in knowledge representation and queries.

Symbolic methods, which take a top-down approach to AI, have very limited success with problems like learning or perception. Symbolic methods fail in learning from data or adapting to environments without clear rules, which is essential in many domains.

Machine learning (ML) branched out from AI as a bottom-up approach of learning from data instead of formulae or rules. Neural networks, for example, are ML systems very successful in learning from data for computer vision, text and audio analysis, and are regarded by many as the state of the art in Artificial Intelligence.

Despite their success and popularity, bottom-up machine learning methods have their disadvantages. For example, neural networks, which have a relatively long history, are opaque and not yet well understood. They are black boxes from which is difficult to extract formal knowledge. In addition, these methods, including Deep Learning, cannot incorporate the already known formal knowledge; they have to learn everything from training data, i.e. from examples. This poses an important limitation since realistic and most interesting problems require a large amount of context that, in practice, cannot be learned from examples. Setting the goal of a machine learning task often requires from modifying the underlying algorithms as there is no way to explain the goal of a complex task to the machine.

The difficulty of extracting formal knowledge from neural networks also limits the ways neural networks can work together. Cooperative learning of neural networks is difficult without a good mechanism for formal knowledge extraction and transfer; neural network systems have to scale-up either as a single, large neural network or as an ensemble of competing, instead of cooperating, neural networks.

Scaling-up a machine learning system as a single entity rather than as independent but cooperating entities is challenging. In a neural network meaning emerges from many, close interactions of multiple units, or neurons. Said interactions require abundant, frequent and synchronous communication between a large number of units. This frequent communication is required for both, learning a task and operating an already trained neural network.

In addition, the communication between neural units have a transient meaning; it makes sense the moment it occurs and not latter. Having a large number of frequent and synchronous interactions poses a formidable engineering problem. The more synchronous, frequent and broad the internal communication in a system needs to be, the more difficult is to scale-up the system and the more expensive and high-performance the internal communication has to be. Communication busses between processing units tend to be more expensive for these systems and processing units have to be placed closer to each other. This requires form high-density processing systems such as GPUs or multicore processors which are also more costly.

SUMMARY

This specification describes a method to resolve the problem of scaling-up distributed machine learning systems with multiple computing devices. The method for distributed machine learning uses formal knowledge, training data or both combined as input data. The method can be applied to computing devices working in the same or related learning tasks for cooperative, distributed machine learning.

The method for distributed machine learning consists of independently calculating in each computing device a discrete algebraic model of an a algebra with at least one idempotent operator that is also a model of the input data, then sharing indecomposable components of the algebraic models among the computing devices and then iteratively recalculating the algebraic models to process new input data and/or to process the sharing from other computing devices. This iterative calculation of algebraic models improves them in an open-ended manner or until a learning performance criterion is met.

The method takes advantage of the meaning independent of time of the indecomposable components that are shared. The sharing of indecomposable components can be carried out without the need to synchronize the computing devices, so there are no constraints on when or on how many times the sharing occurs. The computing devices can operate without waiting or interrupting their ongoing calculations due to the reception of the sharing from other computing devices and without the obligation to use a sharing load every time it is received.

The method uses asynchronous communication among computing devices, each device computing its own discrete algebraic model and all collectively computing a distributed model that provides a solution for the scaling-up of machine learning systems. This method enables the distributive learning without the need for the synchronization of computing devices, reduces communication bandwidth constraints and eliminates the need for highly-efficient communication busses.

Algebraic models are calculated in each computing device. We refer to these models as algebraic output models. The user or users obtain useful machine learning output by using the partial order induced by the idempotent operator in one or many of the algebraic output models. The partial order provides responses to queries provided by the users.

The algebraic output models calculated are discrete, explicitly decomposed in indecomposable components and with as few indecomposable components as possible, resulting in algebraic models that are good at generalizing from input data to test data. To calculate these algebraic models the method targets algebraic properties such as model size, indecomposability and algebraic freedom instead of using probability, error or entropy function minimization that is characteristic of statistical learning. The non-statistic purely algebraic approach of the invention results in a learner that does not need parameters or hyperparameters to fit and that is robust to the statistical composition of the input data.

The algebraic approach taken allows using a common encoding for training data and formal knowledge enabling the combined use of both forms of input. Training data is the most common input of machine learning systems and refers to "learning by using examples", i.e. by providing data items that belong to various categories to be learned while formal knowledge refers to known relationships in the input data and also to constraints imposed by the user of the method to the algebraic output model.

The method uses directed graphs to represent models of the algebra with at least one idempotent operator. The operations performed by the computing devices in the directed graphs during learning transform the directed graphs in a series of intermediate transformations to grow the algebraic models of the input data.

To apply the method for distributed machine learning at least one computing device is needed capable of storing and manipulating large directed graphs. A representation of the directed graphs in the memory or circuitry of the computing devices that is suitable for the method uses multiple bit-arrays that can be efficiently manipulated using bitwise operations. Learning operations of the method correspond with algebraic manipulations mapped to graph transformations that are implemented in the form of bitwise operations over bit-arrays of arbitrary length.

Computing devices here refer to computing hardware, i.e. to machines and also to computing threads within the same or different machines. The term "indecomposable components" is used as in the field of Universal Algebra. With "related problems" we refer to learning problems that require similar skills and use a common encoding scheme for the input data. With "as few as possible" we refer to doing a best effort in minimizing and not to reaching absolute extreme values. The words "generalizing" and "test data" are used as in the field of Machine Learning.

BRIEF DESCRIPTION OF DRAWINGS

Many additional features and advantages will become apparent to those skilled in the art upon reading the following description, when considered in conjunction with the accompanying drawings, wherein.

DETAILED DESCRIPTION

S1. Overview

Provided herein is a method for distributed machine learning with asynchronous cooperation of multiple machines or computing threads. The method consists of calculating a discrete algebraic model of the input data in one or many computing devices that share the indecomposable components of the discrete algebraic models. The method calculates the algebraic models using various purely algebraic, non-statistical, stochastic operations. This description describes in detail how to compute the operations needed to obtain the algebraic models as well as the software apparatus required to implement said operations efficiently for practical use. The description also describes how to calculate the derived order relations that encode the indecomposable components and can be shared among the computing devices.

This method for distributed machine learning provides a solution to the problems described in the background of the Invention section. The method allows for the interchange of algebraic entities that are independent of temporal context, permanently meaningful and, therefore, transferable asynchronously. Unlike neural activations, that are transient and have no meaning without a temporal context, the algebraic entities transferred have a meaning independent of time. This enables machines to delay interaction for a period of time arbitrarily long. The ability to delay communication enables the use of cheaper hardware and effectively opens the door to large-scale, cooperative machine learning systems.

Algebras as understood here as in the field of Model Theory or Universal Algebra and correspond with a set of formal rules, operators and constants. An Algebraic model is a set of items, including the constants of the algebra, that satisfy the rules of an algebra and can be operated with the operators of the algebra to form other items in the set of items. We refer to the items with the name "algebraic elements".

The distributed machine learning method of this invention calculates algebraic models that can generalize from input data. The algebraic models are models of an algebra that should have at least one idempotent operator.

The word "generalization" is used here with the meaning that it has in the field of Machine Learning. The method of the invention can be used for unsupervised or supervised learning including, but not limited to, pattern recognition and classification.

The output of the distributed machine learning method corresponds with an algebraic representation of the input data itself in the form of an algebraic model. We refer to such representation as "algebraic output model". The method of the invention produces a model of an algebra with an idempotent operator, the model explicitly decomposed into indecomposable components. In addition, each indecomposable component is explicitly mapped to a single algebraic element of the algebraic output model generated by the method. We refer to algebraic elements that map to an indecomposable component of an algebraic model as an "atom" of the algebraic model.

In addition the algebraic nature of the method allows for the encoding of formal knowledge and training data in the same manner, enabling the use and combination of both forms of input. Using the method of the invention, a machine can learn from data how to resolve a problem for which there is a formal context. Formal knowledge about a problem can be transferred to the machine in a single interaction, without requiring training.

The input to the distribute machine learning method comprises "training data" and/or formal knowledge. Training data is the most common input of machine learning methods. Herein training data refers to data items that are examples of one or more categories to be learned, each example—either belonging or not belonging to the one or more categories. Categories refer to classes, divisions or partitions of the training data regarded as having a particular shared characteristic. In other words, training data refers to data items provided as examples or counterexamples of a property that the machine should learn. In addition to training data, the method of the invention can use formal knowledge, that is, the knowledge we might want to incorporate to describe the goal of the learning problem at hand or to help resolve it. A classical problem using "training data" is learning to classify handwritten digits from a set of labeled images provided as training examples. Results of the method of the invention in the MNIST handwritten character database is given in the reference paper, "Algebraic Machine Learning", published Mar. 14, 2018 and available at the Cornell University Archive with reference arXiv: 1803.05252. "formal knowledge" refers to one or many mathematically formal interrelations in the input data that can be used to define, constrain or help resolve a problem. As an example, consider the M-Blocked Queens Completion problem in dimension N×N discussed in the reference paper. "Formal knowledge", in this example, refers to the rules of the chess game and also to the description of the desired output, that is, a chessboard with N queens that should not attack each other.

Combining training data and formal knowledge is based on the ability to encode both of them in the same manner, in the form of order relations. Order relations are pairs of algebraic elements of the algebra. Each pair has a binary value assigned. These two values are named here as "positive" and "negative". A consistent encoding of the input data in the form of order relations is the responsibility of the user. The encoding of the data for a given problem is referred here as "embedding strategy" or "encoding scheme" for the problem. Encoding schemes are provided, as examples, in the reference paper for various problems including character image recognition.

The proposed distributed machine learning method achieves generalization using a mechanism fundamentally different to that of statistical learning algorithms. Statistical learning algorithms specifically target reducing error. The method of this invention does not directly target error and therefore does not use function extremization, error minimization, entropy minimization, or regularization.

Generalization is achieved here targeting model size and "algebraic freedom" instead of error or accuracy. The distributed machine learning method consists of a series of algebraic operations carried out with the goal of generating discrete algebraic models of the input data with minimum size and maximum algebraic freedom. Model size corresponds here to the number of indecomposable components of the algebraic output model and "algebraic freedom" relates to how likely is for two algebraic terms of the algebraic model chosen at random to be related by the well-known partial order defined by an idempotent operator. The more free the algebraic output model is, the more likely is two terms picked at random produce the same algebraic element.

The distributed machine learning method uses a directed graph to encode a model of the algebra with at least one idempotent operator. To apply the method is, therefore, necessary to use one or many computing devices capable of storing and manipulating large directed graphs. The directed graph is represented in the memory or circuitry of the computing device in the form of multiple bit-arrays of arbitrary length that can be operated using bitwise operations. The method starts by representing the input data on each computing device with an initial directed graph that is then manipulated in a series of transformation until the directed graph becomes a suitable representation of the input data in the form of an algebraic model of the input data useful for machine learning.

Since the method of the invention is purely algebraic and only uses discrete algebraic elements, it can be considered symbolic. However, the algebraic elements used in this invention do not necessarily have an immediate meaning. Instead, meaning emerges from the composition of many algebraic elements, particularly, the algebraic elements that map to indecomposable components of the algebraic output model. Meaning is not an emergent property in other symbolic approaches, where, instead, symbols directly map to meaningful entities.

The distributed machine learning method of the invention does not manipulate formulae and does not use production rules, which is common in top-down approaches. Compared with other symbolic methods the main advantage of the different approach taken is that it also works in the bottom-up scenario where learning occurs from training data, enabling the combined use of formal knowledge and training data in the same machine learning system.

Compared to existing bottom-up approaches, such as neural networks, deep learning, fuzzy logic and other statistical learning techniques, the distributed machine learning method proposed here differs in almost every aspect. Unlike statistical learning methods, the method of this invention does not use probabilities, weights or frequencies. It does not use Bayesian techniques nor relies on minimizing error or entropy functions. The distributed machine learning method does not use floating point operations, neither needs to find values for weights or other parameters. Instead, the distributed machine learning method of the invention targets algebraic properties such as model size, indecomposability or algebraic freedom. Difficulties derived from the extremization of functions are absent.

Compared with statistical learning methods (neural networks, including deep learning, also belong to this category) the distributed machine learning method of the invention has other advantages. Statistical learning methods are very sensitive to the composition of the training dataset and tend to forget what has been learned if training is not reinforced with sufficient frequency. In contrast, the distributed machine learning method of the invention is not sensitive to the order or frequency of presentation of input data and it is, in general, less sensitive to the statistical composition of the training dataset. Statistical methods are not only sensitive to the composition of the training data but also to the order of presentation and frequency of presentation of the items in the training data. An appropriated training dataset for realistic problems can be very large and difficult to collect. Resolving a learning problem using a statistical learning method has the added difficulty of finding not only the training data for a problem but also the proper statistical mixture for the data. Robustness to input data frequency is essential when the machine has to learn while operating because frequencies of events cannot be controlled and are unpredictable in real-life usage.

Another novel and useful aspect of the invention is that it is capable of assigning values to a set of interrelated variables collectively rather than independently. This cannot be done with other machine learning systems that assign values to variables independently of the others and cannot take into account the interrelations that may exist among them.

Unlike with state of the art methods in machine learning, the user of the distributed machine learning method of the invention does not need to guess values for learning parameters, metaparameters or connectivity architectures. The method of the invention is fully non-parametric.

The distributed machine learning method enables multiple computing devices working in the same or in related problems to learn cooperatively without communication constraints. Computing devices refer here to machines and also to computing threads within the same or different machines. The method of the invention consists of calculating an algebraic output model on each computing device independently using the machine learning method and to derive from the algebraic output model a "pinning structure" that can be shared asynchronously with other computing devices. The pinning structure corresponds with the indecomposable components of the algebraic output model or with a set of derived order relations that define the indecomposable components. The reference paper sometimes refers to the derived order relations with the name "pinning relations". When a computing device receives all or part of the pinning structure from some algebraic output model independently calculated in another device, the computing device that receives the pinning structure can simply incorporate as additional input all or part of part of the received derived order relations. The computing device that receives the pinning structure can also incorporate all or some of the received indecomposable components as additional algebraic elements. This sharing allows for knowledge transfer that can happen asynchronously at any time and can be delayed indefinitely.

S2. Input and Output to the Machine Learning Method

Figure 1:
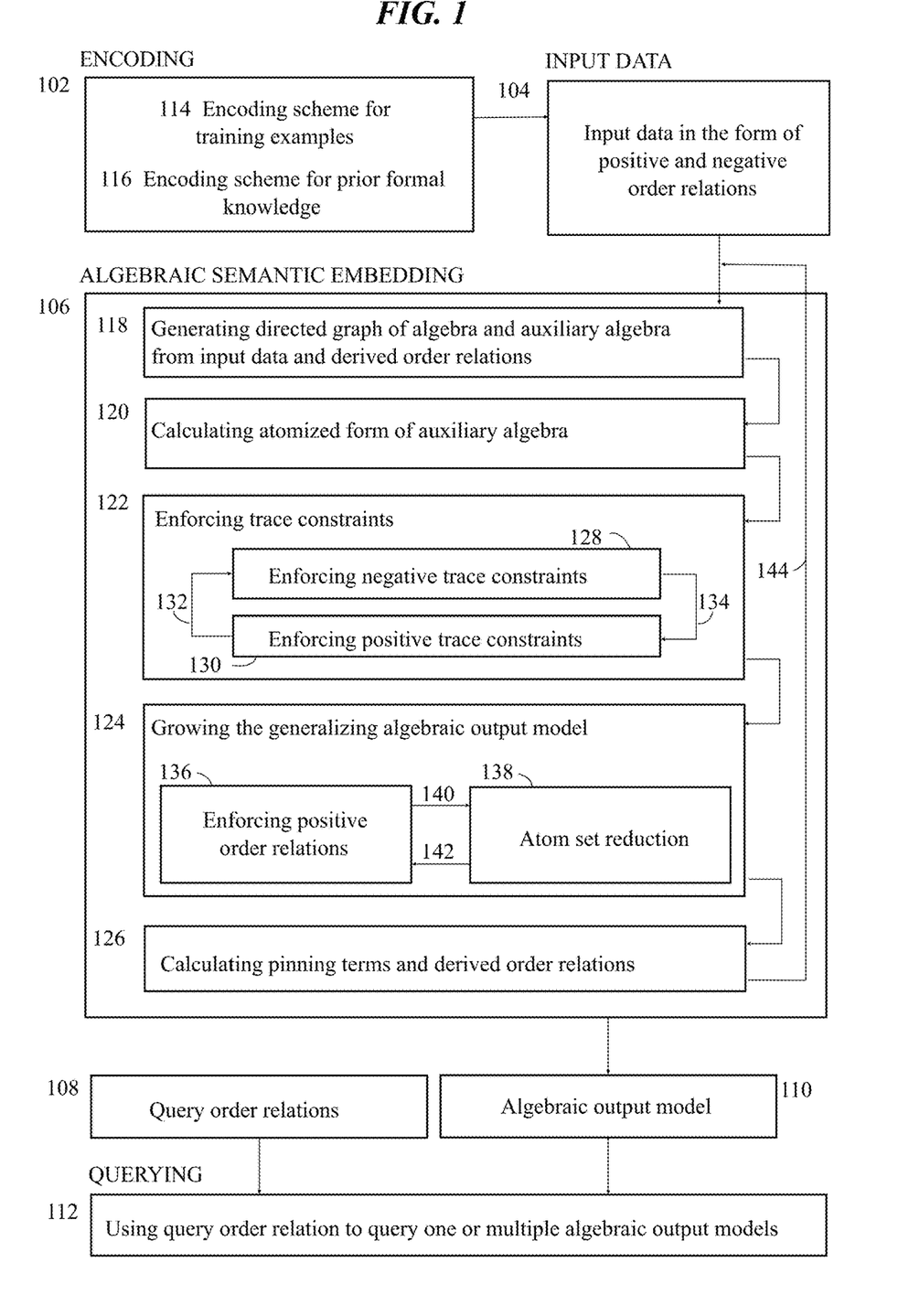
FIG. 1 is a flowchart of the machine learning method depicting a process for a generalizing algebraic semantic embedding that generates an algebraic output model from input data, the input data comprising formal knowledge and training examples.

Referring to FIG. 1, a flowchart 100 of the algebraic machine learning system involving an "encoding scheme" or "algebraic embedding" 102 prepared by the user of the machine learning method with the goal of expressing all the available data with two kinds of relations, the "positive" kind and "negative" kind order relations 104. The words "positive" and "negative" have been chosen arbitrarily so as to designate two mutually exclusive values. The positive and negative order relations are used as input to the machine learning method that calculates an algebraic semantic embedding of the data 106. Besides the training and formal knowledge data, the machine learning method does not require further input such as learning parameters or metaparameters. The algebraic semantic embedding 106 outputs a directed graph that encodes an algebraic representation 110 of the input data. A set of query order relations 108 provided by the user of the machine learning method is then used to query 112 the algebraic output model. The methods of this invention can be generalized to a machine learning method that uses relations that have a value in a Boolean Algebra that may, but not necessarily, be limited to two mutually exclusive values.

S3. Encoding Scheme

Figure 2:
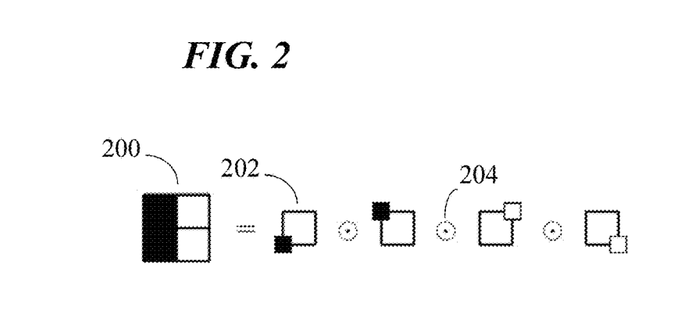
FIG. 2 is the construction of a term of the algebra by means of operating constants using an idempotent operator. The figure is provided as an example where the term represents an image in 2×2 dimensions, and the constants represent the pixels, black or white, at different locations in the image.

The machine learning method assumes as a precondition that a user has an encoding scheme 102 for the available data, said data consisting of training examples 114 and formal knowledge 116. The encoding scheme shall use only a generic order relation operator and its negation, and a generic idempotent, commutative and associative binary operator. For example, in the problem of identifying handwritten characters given in the reference paper, the chosen encoding consists of defining primitive elements for each pixel location and color and also defining primitive elements for each of the ten digits. From the user's perspective said "defining" consists in providing a name for each of the primitive elements by means of a software interface. Primitive elements are algebraic elements defined by the user that will eventually be mapped by the machine learning method to constants of the algebraic output model 110, using the word "constant" as in the field of Universal Algebra. In the example of identifying handwritten characters, the chosen encoding scheme associates an image of a digit with a set of primitive elements corresponding to the pixels in the image. A set of primitive elements provided as input to the machine learning method is mapped in the algebraic output model 110 to a "term" of the algebra that consists in the idempotent summation of the constants associated to the primitive elements in the set. In FIG. 2, given as an example, a term 200 is calculated representing an image that contains a vertical black bar by operating constants that represent pixels 202 with the idempotent operator 204. A term, in general, can be understood as a set of component constants. Using the software interface a user can define a set of primitive elements which results in the introduction of a term in the algebra. The encoding scheme 102 should specify how to encode training examples 114. For the example of handwritten characters identification, the encoding scheme chosen encodes each training example with ten order relations and a term "x" that represents an image. Each of the ten order relations consists of the term representing the image and a constant representing a digit. Only one of the nine order relations is positive and it can be interpreted as an indication, given to the system, that image "x" is a handwritten example of a digit "d" while the other nine are negative relations indicating that image "x" does not correspond to digit "t". Using the generic order relation operator "<" we can write (d<x) for the positive order relation and not(t<x) for the nine negative order relations, where t takes values for all the digits different than d.

S4 Encoding of Formal Knowledge

Formal knowledge should also be encoded in the form of order relations 116. As an example, consider the M-blocked queen completion problem. The encoding scheme for this problem is analyzed in detail in the reference paper. The M-blocked queen completion problem is shown as an example of learning purely from formal knowledge in boards of dimension 8×8 and as an example of learning from a combination of training and formal knowledge in boards of dimension 17×17. The chosen embedding for this problem uses 2×N×N constants to describe the N×N board, two constants for each board square, one to describe the board position of a queen and another for an "empty" position without a queen. A board or subset of the board is then represented by the term that results from the idempotent summation of the constants corresponding to the queens and empty positions in the board or subset of the board. Attack rules and rules of insertion of queens in the board are then expressed as input order relations between terms, each term corresponding to sets of constants for queens and constants for empty squares as detailed in the reference paper. The example illustrates how to express formal knowledge using a set of positive and negative order relations 104 that, in turn, can be used as input of the algebraic semantic embedding 106. Finding an encoding scheme for a problem is often straightforward but in some cases it may be far from obvious. Formal constraints such as the one of not having two queens attacking each other act as constraints in the behavior of the algebraic output models 110 obtained.

Figure 3:
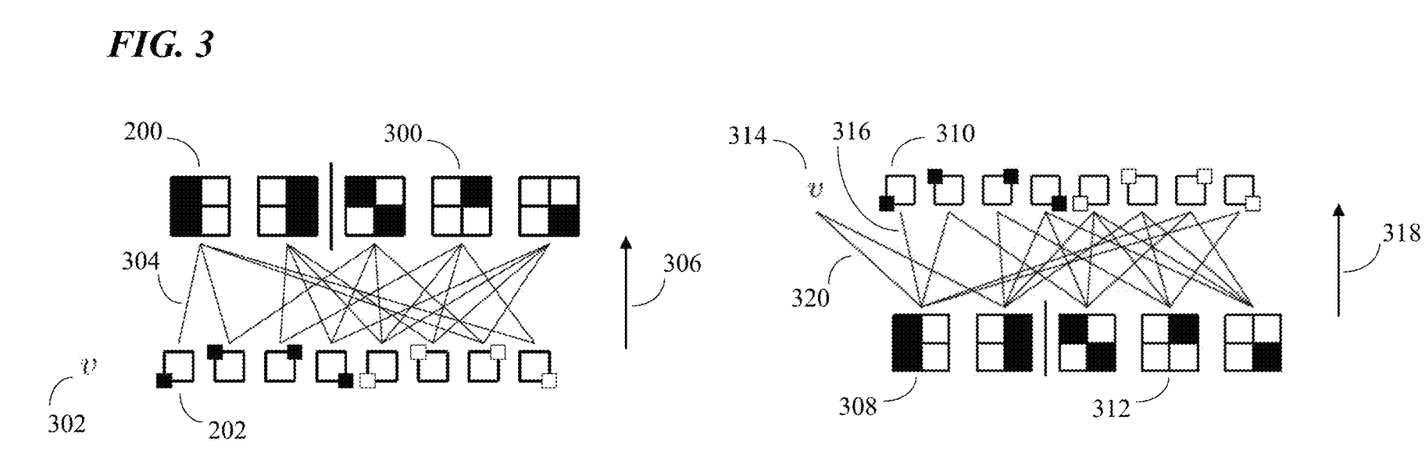
FIG. 3 initial state of the directed graph for the example problem of teaching a machine to learn how to distinguish images containing a vertical black bar from images that do not have a black bar.
Figure 5:
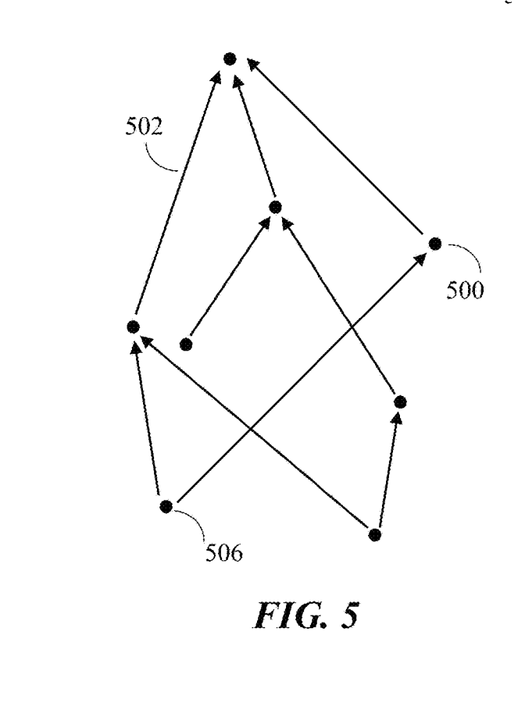
FIG. 5 depicts the type of directed graph used to implement the algebraic semantic embeddings in computer memory.

The machine learning method of this invention assumes the user has its own, consistent, encoding scheme for formal knowledge and S5. Initial Directed Graph In the process of calculating the algebraic semantic embedding 106, the first step 118 is to encode order relations 104 in a directed graph. In a directed graph all edges have a direction. FIG. 3 and FIG. 5 show examples of the directed graph. FIG. 3 use lines 304 to represent directed edges with direction 306 pointing upwards. In FIG. 5, that shows another example of the directed graph, the direction of the edges is made clear by using arrows. The mechanism to build the initial directed graph is deterministic and depends upon the input data alone, so the user does not need to guess connectivity patterns. To build the initial directed graph, a node is added for each constant and for each term mentioned in the input order relations 104. We say an algebraic element is "mentioned" in an order relation if it is one of the two algebraic elements that define the order relation. With the word "node" we always refer to graph nodes of the directed graph. Edges departing from the nodes of each component constant of a term are added to the directed graph pointing towards the node of the term. Edges are also added to the directed graph from, say, node t1 pointing towards, say, node t2 if both nodes represent terms mentioned in the input order relations 104 and if the component constants of t1 are a subset of the component constants of t2. Edges are also added to create the transitive closure of the directed graph. Creating the transitive closure involves adding an edge from node a to node c if the directed graph already has the following two edges: one edge from a to b and another edge from b to c, where b is any node of the directed graph. Once the initial directed graph and made transitively closed, if a closed loop is found the nodes in the loop can be identified with a single node transforming in this manner the initial directed graph into an acyclic graph.

S6. Encoding of Positive Order Relations

Positive order relations are also encoded in the directed graph using directed edges, as part of step 118. The encoding of positive relations using edges is related to the underlying use of an auxiliary algebra that is discussed in some detail in the reference paper, section 2.3 and 2.4. The auxiliary algebra is also represented using a directed graph. The directed graphs of the algebra and the auxiliary algebra are shown in FIG. 3 for the example of learning to separate images with a vertical black bar from images without a bar in 2×2 dimensions. On the left side of FIG. 3, the directed graph of the algebra is shown, and on the right side of FIG. 3 the directed graph of the auxiliary algebra. To build the directed graph of the auxiliary algebra, the system first copies the directed graph of the algebra reversing the direction of all the edges. This is shown in FIG. 3 by drawing the directed graph of the auxiliary algebra upside down. Since the directed graph of the auxiliary algebra is a copy of the directed graph of the algebra, every node in the directed graph of the algebra has a mirror node in the directed graph of the auxiliary algebra that we call "dual". For example, node 200 has a dual node in the graph of the auxiliary algebra with number 308, constant 202 has dual 310, and the term 300 corresponding to a negative example has dual 312. The auxiliary algebra can be represented in the same graph using multiple kinds of nodes or multiple kinds of directed edges.

S7. Use of Auxiliary Algebra

To encode a positive order relation (a<b) between two elements a and b, the system adds an edge in the directed graph of the auxiliary algebra departing from the dual of node b to the dual of node a. For example, in FIG. 3, training image 200 contains a vertical bar, which can be encoded with an input relation (v<'200') where v is a constant representing the notion of the vertical line with node 302 and where '200' is the term associated to node 200. This input order relation is encoded in the dual with the edge 320 that departs from the dual of node 200, which is node 308, to the dual of v, which correspond to node 314 with the direction of edge pointing upwards 318. Once each input positive order relation is encoded with an edge in the directed graph of the auxiliary algebra, the system calculates the transitive closure as explained in the previous section, [S6. Encoding of Positive Order Relations]. If cycles appear in the directed graph of the auxiliary algebra, then all the nodes in the cycle should be identified with a single node. Due to this identification of nodes in the auxiliary algebra, said identification intended to make the graph acyclic, two nodes in the graph of the algebra may have the same dual node. At this point, we have finished with step 118. Alternatively, instead of using two directed graphs, it is possible to use a single directed graph and reuse the same node to represent an algebraic element and also to represent its dual in the auxiliary algebra. In this case, the system encodes the edges of the algebra and the edges of the auxiliary algebra using different "kinds" of edges. In the following, for clarity, we assume the usage of two separate directed graphs, one for the algebra and the other for the auxiliary algebra as in FIG. 3.

S8. Atomization of Auxiliary Algebra

The next step is the atomization of the auxiliary algebra 120. The atomization consists of calculating a set of atoms for the auxiliary algebra. Atoms are algebraic elements also represented with nodes in the directed graph and created during stages 120, 122, 132, 134 and 136 of the embedding process 106. Atoms exist for the algebra and also for the auxiliary algebra. In step 120, atoms are introduced in the auxiliary algebra. Atoms in the auxiliary algebra are represented by a node and a single edge that points from the node to a destination node, said destination node corresponding with the dual of a constant or the dual of a term. We introduce atoms in step 120 with the goal of having all the negative order relations in the auxiliary algebra satisfied using as few atoms as possible. We say that a negative order relation not(p<q) is satisfied in the auxiliary algebra if there is some atom u and an edge from u pointing to the dual of q and there is no edge from atom u pointing to the dual p. We say that atom u "discriminates" the negative order relation not(p<q) in the dual algebra. There are various methods to ensure all the negative relations in the dual are satisfied. The simplest method consists of, for each constant and for each term, inserting an atom with a single edge pointing to the dual of the constant or the dual of the term respectively. If said insertion is carried out and if the encoding scheme chosen by the user of the machine learning method is not logically inconsistent it can be proved that any negative order relation consistent with all the positive input order relations is satisfied in the dual (see the proof in the reference paper). To find the atomization of the dual, the system selects a subset of the atoms with as few atoms as possible that suffice to discriminate all the negative input order relations. Efficiently finding this subset can be done in various ways. For example, a simple method to calculate this subset consists of starting with an empty set Q and then reviewing all the negative input negative order relations one by one. For each relation in the set R− of negative input order relations 128 the machine chooses an atom at random that discriminates the relation and adds the atom to the set Q if and only if there is no atom already in Q that discriminates the negative relation. Once all negative relations are checked the resulting set of atoms is the atomization of the auxiliary algebra. The atoms that are not in this set Q can be deleted from the directed graph. The process can be written succinctly as:

---
atom set reduction for the dual algebra

---
initialize sets Q = ∅ and S = R−;
while S ≠ ∅ do
  | choose r ∈ S at random and remove it from S. Let r ≡ ¬(a < b);
  | if $dis_{M^*}$([b], [a]) ∩ Q = ∅ then
  |  | choose an atom ξ ∈ $dis_{M^*}$([b], [a]) and add it to Q;
  | |_
|_
delete all atoms in the set A(M*) \ Q;

---

Where A(M*) is the set of all the atoms in the auxiliary algebra and the symbol [a] is used to refer to the dual of element a, i.e. to the image of element a in the auxiliary algebra. The symbol dis([b], [a]) refers to the atoms in the auxiliary algebra in the lower atomic segment of [b] and not in the lower atomic segment of [a]. The "lower atomic segment" of an algebraic element [a] of the auxiliary algebra corresponds to the set of atoms of the auxiliary algebra with an edge pointing to [a]. The word "choose" refers to picking an algebraic element from a set at random. The backslash corresponds with the subtraction of sets.

S9. The Trace Function

In the process of creating the algebraic semantic embedding 106, the third step consists in enforcing the trace constraints 122. The "trace", written Tr(x), is an operation that takes an algebraic element x of the algebra and returns a set of atoms of the auxiliary algebra. The calculation of the trace requires the calculation of "lower segments" for the graph. The lower segment GL(y) of an algebraic element with node y is the set of all the nodes that have an edge pointing to node y once the directed graph has been made transitively closed. A related construction is the "lower atomic segment" of the graph GLa(y) which is a set of nodes that correspond to atoms in the set GL(y). To calculate the trace of an algebraic element x, intersect the lower atomic segments of the duals of all the algebraic elements contained in the lower atomic segment of x. There is a trace constraint for each input order relation. The trace constraint for a positive order relation (a<b) corresponds with the requirement that set Tr(b) should be a subset of Tr(a). The trace constraint for a negative order relation corresponds with the opposite requirement: Tr(b) should not be a subset of Tr(a).

S10. Enforcing Negative Trace Constraints

Enforcing the trace constraints of step 122 can be achieved in various ways. A way to enforce the trace constraints 122 consists of iterating between enforcing of the "negative trace constraints" for the set R− of all negative input order relations 128 and enforcing of the "positive trace constraints" for the set R+ of all positive input relations 130. The iterations 132 and 134 are performed until all "trace constraints" are obeyed, which usually occurs after a few iterations. Often, two iterations are enough. Enforcing the negative trace constraints 128 is done by following the process in pseudocode format:

---
enforce negative trace constraints

---
foreach (a ≮ b) ∈ R− do
 | if Tr(b) ⊂ Tr(a) then
 | | do
 | | | c = findStronglyDiscriminantConstant(a, b);
 | | | if c=∅ then
 | | | | choose h ∈ C(M*) so h ∈ $GL^c$([b])\GL([a]);
 | | | | add new atom ζ to M* and edge ζ → h;
 | | while c=∅;
 | | add new atom φ M and edge φ → c;
 | |_
 |_
Function findStronglyDiscriminantConstant(a, b)
 | calculate the set Ω(a) ≡ {[c] : c ∈ GL(a) ∩ C(M)};
 | initialize U ≡ Tr(b);
 | while U ≠ ∅ do
 | | choose atom ζ ∈ U and remove it from U;
 | | if Ω(a)\GU(ζ) not empty then
 | | | choose [c] ∈ Ω(a)\GU(ζ);
 | | | return c;
 | |_
 |_
 | return ∅;
|_

---

Where C(M) is the set of all the constants mentioned in the input order relations and C(M*) is the set of the duals of the constants and the duals of the terms mentioned in the input order relations. The symbol [b] is used to refer to the dual of algebraic element b. The word "choose" refers to picking an algebraic element from a set at random. The backslash corresponds with the subtraction of sets.

S11. Enforcing Positive Trace Constraints

The enforcing of trace constraints 130 for the set R+ of the positive input order relations is calculated, with the process, Algorithm 1, in pseudocode:

---
enforce positive trace constraints

---
foreach (d < e) ∈ R+ do
 | while Tr(e) ⊄ Tr(d) do
 | | choose an atom ζ ∈ Tr(e)\Tr(d) at random;
 | | calculate Γ(ζ, e) ≡ {c ∈ GL(e) ∩ C(M) : ζ ∉ GL([c])};
 | | if Γ(ζ, e) = ∅ then
 | | | add edge ζ → [d];
 | | else
 | | | choose c ∈ Γ(ζ, e) at random;
 | | | add new atom φ to M and edge φ → c;
 | |_
 |_
|_

---

Where R+, Tr(e), [d], C(M) and GL(e) and the backslash have been defined in sections [S9. The Trace Function] and [S10. Enforcing Negative Trace Constraints]. Operations require the directed graphs to be transitively closed at all times.

S12. Growing the Generalizing Algebraic Output Model

In the process of creating the algebraic semantic embedding 106, the fourth step consists in calculating the output model 124 by inserting and deleting atoms in the directed graphs. Since the directed graph usually (not always) grow in the number of nodes and edges in this step we refer to it as "growing the generalizing algebraic output model". Step 124 consists of, for each positive input order relation (a<b) ensure the lower atomic segment of a is a subset of the lower atomic segment of b with the added difficulty of using as few atoms as possible and also in making the algebra as "algebraically free" as possible, which means that we want to make unlikely for any two algebraic elements of the algebra chosen at random to have the lower segment of one of them as a subset of the lower segment of the other. This can be done by using two different operations, the enforcing of positive order relations 136 and the atoms set reduction 138. Atom set reduction 138 can be called 140 at any time during the enforcing of positive order relations one or multiple times as, and then return to the enforcing of positive order relations 142. To finish the "growing the generalizing algebraic output model" step 124, we can remove from the directed graph all or some of the nodes representing the terms and the duals of the terms mentioned in the input order relations 104.

S13. Enforcing Positive Order Relations

The enforcing of positive order relations 136 can be done by means of a process we call "sparse crossing". For a positive order relation "(a<b)" in the set R+ of input positive order relations in 104, the sparse crossing comprises deleting nodes and inserting new nodes in the directed graph at locations such that the lower atomic segment of a becomes a subset of the lower atomic segment of b and such that the result of the "trace operator", Tr, remains unchanged in every node of the directed graph. The nodes inserted correspond to atoms of the algebra. The name "lower atomic segment" is defined in [S9. The Trace Function]. The sparse crossing of 136 can be calculated by following the steps of Algorithm 2, in pseudocode:

| Sparse Crossing of a into b |
| --- |
| calculate A ≡ dis(a, b) ≡ $GL^a(a)\backslash GL(b)$; |
| foreach ϕ ∈ A do |
|   initialize sets U ≡ 0, B ≡ $GL^a(b)$ and Δ ≡ $A(M^*)\backslash GL([\phi])$; |
|   do |
|     choose an atom ε ∈ B at random; |
|     calculate Δ' ≡ Δ ∩ GL([ε]); |
|     if Δ' ≠ Δ or Δ = ∅ then |
|       create new atom ψ and edges ψ → ϕ and ψ → ε; |
|       replace Δ by Δ'; |
|       add ε to U; |
|     substract ε from B; |
|   while Δ ≠ ∅; |
|   |_ |
| foreach ε ∈ U do |
|   create new atom ε' and edge ε' → ε; |
| |_ |
| delete all atoms in U ∪ A; |

Where GL(b), GLa(a), the brackets in [ε], C(M), GL(e) and the backslash have been defined in sections [S9. The Trace Function] and [S10. Enforcing Negative Trace Constraints], and the A(M) represent the atoms appended to the directed graph of the algebra (and not to the graph of the auxiliary algebra). The directed graphs are assumed to be transitively closed at all times. It can be proved (see the paper in Appendix I) that when trace constraints are obeyed the sparse crossing leaves the traces of all nodes unchanged. Calculation of traces in Algorithm 3 implicitly occurs with the calculation of set GL([ε]) that, for atoms, is equal to Tr(ε), where ε corresponds to a node directly in the immediate vicinity of, thus "local" to, the inserted node ψ. Enforcing positive relations one by one without iterating through the set of input order relations is a key feature of this invention.

S14. Atom Set Reduction

The second operation in growing the generalization algebra 124 is the "atom set reduction" 138. It consists in the elimination of atoms of the algebra that leaves the trace of each constant of the algebra unchanged. The atom set reduction process 138 has the following steps expressed in Algorithm 4 as:

| atom set reduction |
| --- |
| initialize sets Q ≡ ∅ and A ≡ C(M); |
| do |
|   choose c ∈ A at random and remove it from A; |
|   calculate $S_c$ ≡ Q ∩ GL(c); |
|   if $S_c$ = ∅ then |
|     define $W_c$ ≡ $A(M^*)$; |
|   else |
|     calculate $W_c$ ≡ $\cap_{\phi \in S_c} GL^a([\phi])$; |
|   |_ |
|   calculate $\Phi_c$ ≡ {[ϕ] : ϕ ∈ $GL^a(c)$}; |
|   while $W_c$ ≠ Tr(c) do |
|     choose an atom ξ ∈ $W_c \backslash$ Tr(c) at random; |
|     choose an atom ϕ such that [ϕ] ∈ $\Phi_c \backslash$ GU(ξ) at random; |
|     add ϕ to set Q; |
|     replace $W_c$ with $W_c \cap GL^a([\phi])$; |
|   |_ |
| while A ≠ ∅; |
| delete all atoms in the set A(M) \ Q; |

Where C(M), GLa(c), [ϕ], Tr(c) and the backslash have been defined in sections [S9. The Trace Function] and [S10. Enforcing Negative Trace Constraints], and GU(x) is the upper segment of a node x defined as the set of all nodes of the directed graph that receive edges that depart from x. Operations require the directed graphs to be transitively closed at all times. The atom set reduction operation 138 can be called at any time, for example when the directed graph has grown over some threshold value in the number of graph nodes, at random or until no further reduction is achieved. Reduction by traces can be applied to the constants C(M) or to any other set of generators of the algebra. The reduction by traces operation can be applied either to the constant of the algebra or to any set of generators of the algebra.

S15. Pinning Structure

In the process of creating the algebraic semantic embedding 106, the last step is the extraction of pinning terms and derived order relations 126 intended to build a "pinning structure" for the algebra. The pinning structure is required to avoid the information loss that occurs in the absence of the pinning structure when a set of input order relations 104 is input after the "growing of the generalizing output model" step 124, has been completed for a previous set of input order relations 104. When the "growing of the generalizing output model" step 124 is completed the directed graph is in an "output" state that represents the algebraic output model 110. It is possible to input a new set of input data 104 when the directed graph is already in the output state of a previous input data 104.

Using more than a single "batch" of input data 104 can be used to further train the machine using additional training data and/or additional formal knowledge. Training a machine learning system using multiple stages with the same or different input data is known in machine learning as batch training. It is possible to build a pinning structure using the indecomposable components of the algebraic output model or a set of order relations that we call "derived order relations" that algebraically define the indecomposable components. To build the derived order relations we need to first build some new terms that we call "pining terms". Since the atoms obtained as a result of the process of growing the generalizing algebraic output model 124 correspond to the indecomposable components of the algebraic output model, the "pinning terms" and "pining relations" can be conveniently build from the atoms obtained as a result of the process of growing the generalizing algebraic output model 124, said pinning terms and derived order relations calculated as follows: for each of atom ϕ the machine creates a pinning term T, we call it the pinning term of ϕ, equal to the idempotent summation of all the constants for which there is no edge from ϕ in other words, a constant d is a component constant of the pinning term T of atom ϕ if and only if there is no edge from atom ϕ to constant d. In addition to pinning terms, for each constant c, such that (ϕ<c), create a negative relation not(c<T). We refer to negative relations created in this manner as "pining relations" or "derived order relations". The calculation of pinning terms and derived order relations has the following steps expressed as pseudocode in Algorithm 6:

---
generation of pinning terms and relations
---
let $R_p$ be a new or exisitng set of pinning relations;
foreach ϕ ∈ M do
    | calculate the set H = C(M)\U(ϕ);
    | create the pinning term $T_\phi = \odot_{c \in H} c$;
    | foreach c ∈ C(M) ∩ U(ϕ) do
    | | add r ≡ ¬(c < $T_\phi$) to the set $R_p$;
    | |_
    |_
---

Where U(ϕ) is the upper segment of a nodex ϕ defined as the set of all nodes of the directed graph that receive an edge than departs from ϕ.

The pinning structure, pinning terms and derived order relations, encode the same information than indecomposable components of the algebraic output model 124. All, or some, of the derived order relations can be added 144 to the next batch of input data 104 effectively preventing the mentioned information loss.

Indecomposable components can also be used for distributed machine learning. The indecomposable components have a universal meaning that depends only on the encoding scheme used and not in the full algebraic output model. Due to the universal meaning of the indecomposable components, derived order relations can be shared completely or in part with other computing devices independently calculating their own algebraic output models. Sharing derived order relations allow for transferring skills from machine to machine.

In addition, derived order relations have a meaning independent of time, which makes possible to use at any moment a set of derived order relations to build new algebraic output models. New algebraic output models can be created in the same or different computing devices using the derived order relations alone or in combination with input order relations of training data or prior knowledge or in combination with derived order relations from multiple other machines. The non-transient meaning of the indecomposable components or their equivalent, the derived order relations, provides a mechanism for cooperation and parallelization that has no synchronization constraints. The sharing of derived order relations is optional and the use of received order relations from other computing devices is also optional and can be delayed for as long as needed.

S16. Querying the Algebraic Output Model

The result of the algebraic semantic embedding 106 is the algebraic output model 110. The algebraic output model is the algebra represented by the directed graph in the state it has after the stage "grow generalizing algebraic output model" 124 is completed. Alternatively, the state of the directed graph after the calculation of pinning terms 126 can be used with the same result as it produces the same algebraic output model. Data of practical use can be retrieved from the algebraic output model by means of a set of query relations 108. A query order relation is a pair of algebraic elements of the algebra provided by the user with the goal of finding its value, either positive or negative. To assign a value to a query order relation, a set, the "lower atomic segment set", has to be calculated for each of the two algebraic elements of the pair. An algebraic element of the algebra mentioned in a query order relation may or may not have a node in the directed graph of the algebraic output model. All constants have nodes in the directed graph so an algebraic element mentioned in a query order relation that have no node should correspond to a term of the algebra. The lower atomic segment of a term that has no node is equal to the set of atoms of the algebra that have at least one edge pointing to at least one component constant of the term. If an algebraic element mentioned in the query relations already has a node its lower atomic segment is equal to the set of atoms of the algebra with an edge pointing to the node of the algebraic element. If the user provides a query relation 112, say (a, b), the query relation has a binary value that is considered "positive" is if a<b holds true in the algebraic output model 110 and "negative" if not. To determine if a<b in the algebraic output model, the system checks if the lower atomic segment of algebraic element a is a subset of the lower atomic segment of b. Therefore, for a query order relation (a, b) the calculated binary value is positive if the lower atomic segment of element a is a subset of the lower atomic segment of the algebraic element b, otherwise, the calculated value for the relation is negative. A user of the machine learning method can input a query relation by providing an ordered pair of algebraic elements using a software interface, said algebraic elements referred by their names or, for a term without a node, by the name of the component constants of the term. The user receives an output binary value, positive or negative, for the query relation.

S17. Other Forms of Querying

Other forms of querying the algebraic output model are also possible. For example, the user may provide an algebraic element b and the output is then the list of constants of the algebra "c" such that c<b. We can see this form of querying as a description query for the b. In this case, the system checks for each constant c and returns the constant as the output of the query if c<b. As in the previous section [S16. Querying the Algebraic Output model], the system calculates if c<b by checking if the lower atomic segment of the algebraic element c is a subset of the lower atomic segment of algebraic element b. Another form of querying the algebraic output model consists of providing an algebraic element a to find one or many algebraic elements b such that a<b. We can see this form of querying as an "instantiation" of the algebraic element a. In this case b is a constant or a term and the output corresponds to one, of many possible, set of constants K, perhaps containing a single constant, that collectively contain all the atoms in the lower atomic segment of a, i.e. the union of lower atomic segments of the constants in K should contain the lower atomic segment of a. The set K can be calculated by the machine as follows: for each atom in the lower atomic segment of algebraic element a pick a constant at random that contains the atom and add the constant to K.

S18. Terms as Sets

Referring to FIG. 2, a term 200 of the algebra representing an image obtained with the idempotent summation 204 of the constants 202 that represent the pixels in the image. FIG. 2 shows how a term can be regarded as a set of constants and how it can be build using the idempotent operator. The representation of an image as a set of pixels is a choice of the user of the machine learning method and it is provided here as an example.

S19. Graph of the Algebras

Referring to FIG. 3, the direct graph used to represent the algebra in the computing device memory or circuitry for the example problem of learning to distinguish images in dimension 2×2 that have a vertical black bar from those that do not have a vertical black bar. The state of the directed graph corresponds to the end of step 118. In this example, there are 8 constants for the four-pixel locations and the two colors, white or black, plus an additional constant v representing the concept of "having a vertical black bar" that has to be learned. The constants for the pixels and colors are represented in the image with square boxes with a white or black solid square in the corner corresponding to the location of the pixel in the image. For example, 202 is the node of the constant that represents the bottom left black pixel. Example training images are associated with terms of the algebra and have nodes in the directed graph, like node 200 or node 300, represented in FIG. 3 using the images themselves. In FIG. 3 a training set is depicted containing two images with a black vertical line, one of them with node 200, and three images without a black vertical bar, one of them with node 300. Edges, like 304, in the directed graph are directed and represented in FIG. 3 with a solid line instead of an arrow to avoid clutter. The direction of all edges in this figure points upwards 306. As part of step 118 edges have been added from the nodes of the component constants of each term to the term's node. For example, edge 304 is added from the node 202 of the constant that represents the bottom left black pixel to the node of image 200 that has this pixel. Depicted on the left side of FIG. 3 is the directed graph for the algebra and, on the right side, the directed graph of the auxiliary algebra. All nodes in the right of FIG. 3 represent the "duals", as defined in section [P6. Encoding of Positive Order Relations], of algebraic elements. The directed graph of the auxiliary algebra, shown on the right of FIG. 3, is an inverted mirror image of the directed graph of the algebra that contains some extra edges. Note that the directed graph of the auxiliary algebra contains an additional edge from the dual of 200, which correspond to 308, to the dual of v, which correspond to 314, while the directed graph of the algebra in the left has no edges arriving or departing from v at step 118.

S20. Cooperative Learning

Figure 4:
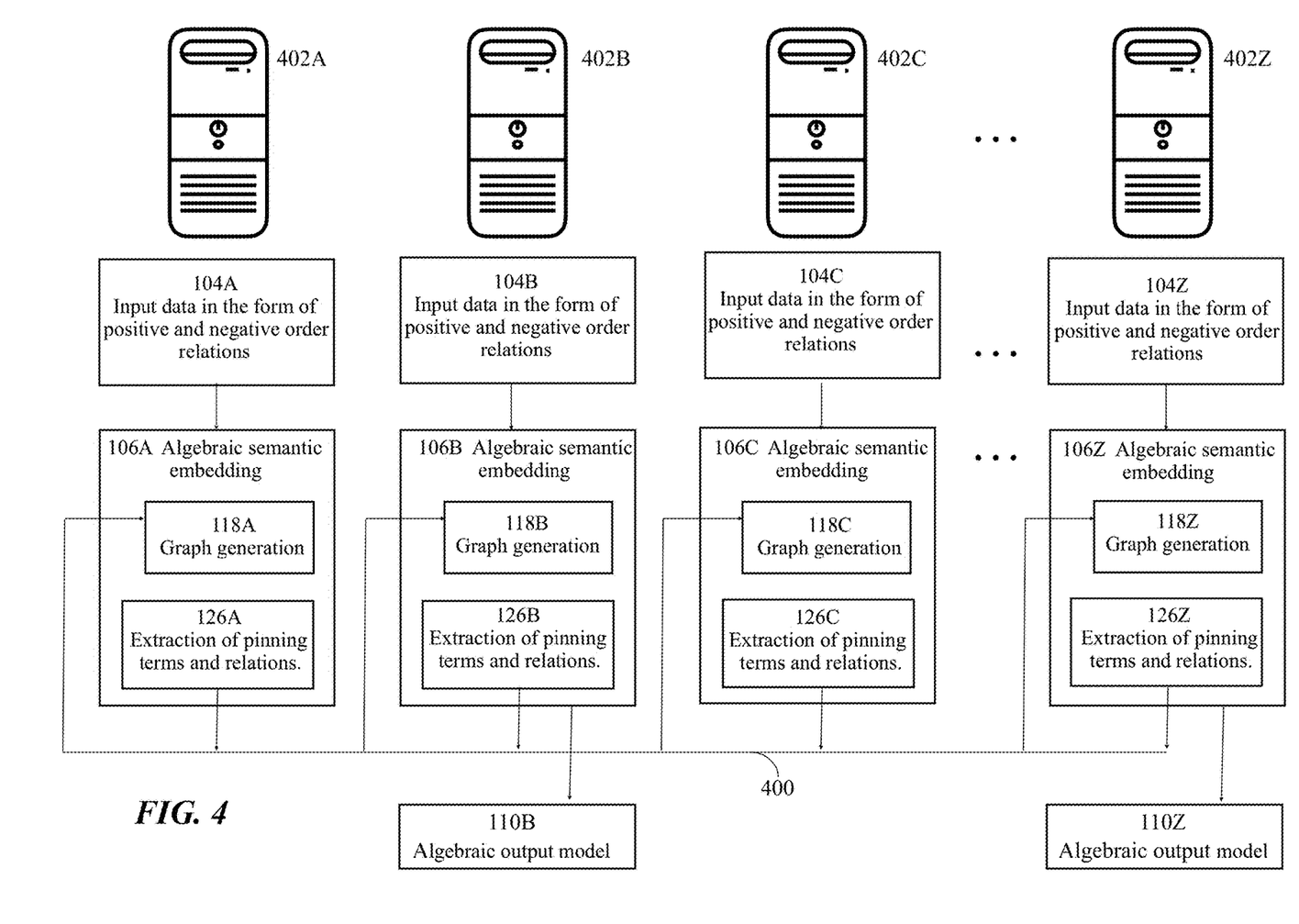
FIG. 4 is a block diagram of a system having many computing devices, each device generating one or several algebraic output models by the collaboration of the many computing devices, each computing device applying the machine learning method to its own input data and the system using the mechanism of the invention for asynchronous cooperation or parallelization.

Referring to FIG. 4, a flowchart of the process involved in cooperative learning. Cooperative learning uses multiple computing devices, i.e multiple computing machines and/or computing threads 402A, 402B, . . . , 402Z, each calculating an algebraic semantic embedding 106A, 106, . . . , 106Z. Each device is represented in FIG. 4, in simplified manner by its input data, 104A for algebra A, 104B for algebra B, 104C for algebra C, and so on until 104Z for algebra Z, and the algebraic semantic embedding, 106A for algebra in device A, 106B for algebra in device B, 106C for algebra in device C, until 106Z for algebra in device Z. Input data for different devices may correspond to the same or to different (but related) problems and the algebraic output models, like 110B or 110Z, of one or of all of the devices can be used for querying 108 by a user. Multiple algebraic semantic embeddings can be independently calculated in different devices and the pinning structure calculated at stages 126A, 126B, 126C, . . . , 126Z of one algebraic output model can be transferred using a data bus 400 to another, said pinning structure comprising atoms, pining terms and pining relations. The pinning structure transfer can be partial or total and can occur at any time and with any frequency. The transfer is implemented by adding the atoms, pinning term or derived order relations of a donor algebra to the input of a recipient algebra at stages 118A, 118B, 118C, . . . , 106Z. The data bus 400 does not require of low latency and can use any form of data transfer mechanism such as an IP-based Internet line.

S21. Asynchronous Communication

The form of parallelism achieved by sharing the pinning structure of independently computed algebras is different and more powerful than the parallelism attained by distributing the computation of a single algebraic semantic embedding 106 in multiple devices. The main advantage is that sharing of the pinning structure is asynchronous. A computing device makes available all or part of the pinning structure of a donor algebra, for example by using a publication-subscription protocol, and the receptor algebra conveniently uses all or part of the pinning structure when is at stage 118. Message latency is no longer a problem in this paradigm. If a device calculating a receptor algebra misses a publication message with the pinning structure of another out algebra, the computing device can always use the message next time it process an input batch 104. Increased message-latency tolerance allows relaxing requirements for communication busses. With this machine learning method, learning machines can communicate using low performance communication lines such as IP-based networks like Internet. Low performance communication lines are widely available and cheaper than the high performance communication busses used to interface machines using with methods of machine learning that require synchronous communication.

Asynchronous communication is also a key advantage for parallelization when using a single processor with multiple computing threads.

S22. Graph Edges And Partial Order

Referring to FIG. 5, a directed graph is used to represent the discrete algebra in the computer memory or circuitry along the many stages of the computation of the algebraic semantic embedding 106. The directed graph has nodes 500 for the algebraic elements mentioned in the input order relations and also has nodes for the "atoms" calculated during the semantic embedding as well as for their duals, i.e., the images in the auxiliary algebra described in section [S6. Encoding of Positive Order Relations]. Lower algebraic elements are connected to upper algebraic elements by an edge 502. Unlike FIG. 3, which has directed edges drawn using solid lines, in FIG. 5 directed edges are drawn with arrows. Nodes and edges are appended to the directed graph and also removed from the directed graph many times during the algebraic semantic embedding process 106. Nodes for atoms are created and destroyed in stages 120, 122, and 124. When a directed edge exists from a lower node 504 representing an algebraic element a of the algebra to an upper node 500 representing algebraic element b, the lower algebraic element a results "smaller" than the upper algebraic element b with respect to the partial order, we can write a<b. However, it is not always true that if a<b holds in the algebra represented by the directed graph there is an edge from a to b. In general a<b holds if and only if the lower atomic segment of a is a subset of that of b.

S23. Use of Bit-Arrays

Figure 6:
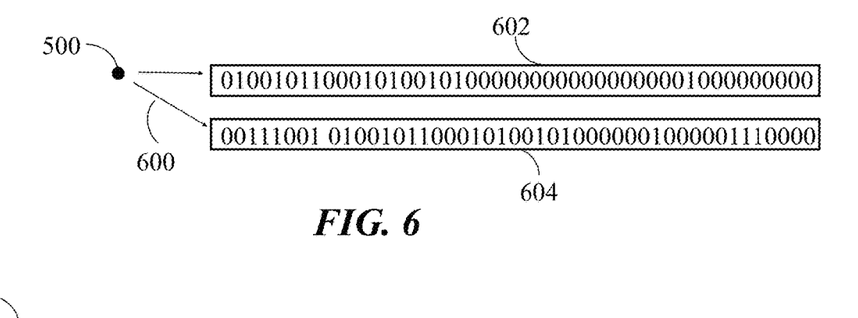
FIG. 6 depicts how each node in the directed graph can be represented in computer memory using two bit-arrays.

Referring to FIG. 6, a depiction of how the storing and manipulation of the directed graph during the many steps of the algebraic semantic embedding 106 can be conveniently done using bit-arrays. A bit-array is an array of bits, in this case of variable length that is operated in a "bitwise manner", i.e. the same logical binary operation is performed to each of the bits in the bit-array. Each node is implemented in the computer with an index and two bit-arrays. A node x is represented with the following two bit-arrays: one bit-array, the "children's' bit-array", that specifies all the nodes with edges pointing to x, and another bit-array, the "parents' bit-array", that specifies all the nodes that receive edges departing from node x. Collectively the bit-arrays of all the nodes encode the same information, the adjacency matrix of the directed graph, twice. This memory inefficiency is compensated by an increased computation performance. In FIG. 6, a node 500 is represented 600 in the computing device with two bit-arrays, the parents' bit-array 602, and the children's' bit-array 604. The existence of an edge from node a to node b is encoded in the parents' bit-array of node a with a binary number 1 set at the position in the bit-array corresponding to the index of algebraic element b. In addition, a binary number 1 is also set in the children's' bit-array of node b with a binary number 1 at the position in the bit-array corresponding to the index of algebraic element a. For increased efficiency, lazy dynamic programing can be used to delay the calculation or the update of the bit-arrays associated to nodes. Particularly, it is possible to apply lazy dynamic programming to the calculation of transitive closures because the information required to calculate transitive closures is permanently encoded in the edges of the directed graph. The edges that collectively imply the transitive closure are never deleted until the embedding 106 has finished.

S34. Bitwise Operations

Figure 7:
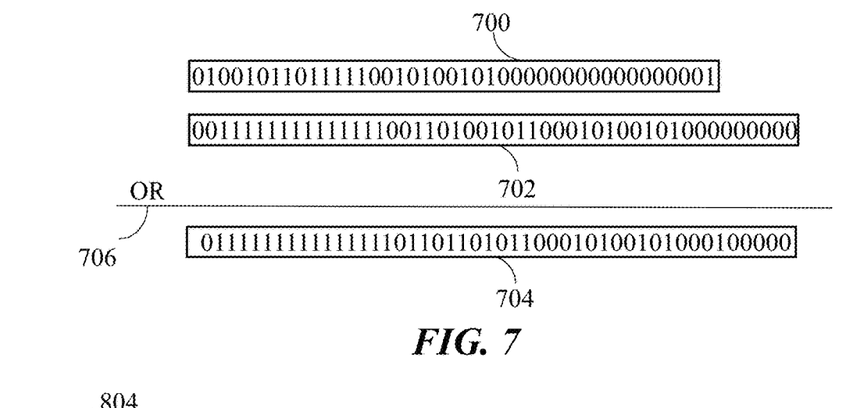
FIG. 7 depicts how each bitmap may be implemented in computer memory, in compressed or uncompressed formats, during the algebraic semantic embedding.

Bitwise operations among bit-arrays can be used, for example, to efficiently find the nodes that are in the upper segments of a node a and also in the lower segment of another node b. In this case a bitwise AND operation would be performed between the parents' bit-array of a and the children's bit-array of b. To calculate the nodes that are either in the lower segment of a or in the lower segment of b, a bitwise operation OR is carried out between the children's' bit-array of a and the children's bit-array of b. It should be clear that lower segments correspond to lower segment of the directed graph and not necessarily to lower segments of the algebra. This is exemplified in FIG. 7 with bit arrays 700 and 702 operated with a bitwise OR, 706, to obtain a bit array 704. Sets of nodes can be efficiently calculated by using bitwise operations over the bit-arrays associated 600 to nodes. When the two input bit-arrays of a bitwise operation have different lengths, the result of the bitwise operation is equal to that obtained if the smaller input bit-array is extended with a sequence of binary zeros until its size matches the size of the largest input bit-array. In general, bit-arrays used in the machine learning method are either directly associated to nodes or formed operating bit-arrays associated to nodes with bitwise operations to form bit-arrays representing sets of nodes. Bit-arrays not associated to nodes can be calculated, used, and then returned to a bit-array pool for efficient memory management. All sets mentioned in the steps of the algebraic semantic embedding 106, including the various sets defined in the pseudocode can be calculated using bitwise operations over bit-arrays. For example, the subtraction of sets A\B represented with a backslash in the pseudocode can be calculated by flipping the bits of the bit-array associated to set B and then by doing a bitwise AND with the bit-array of set A. To improve performance, dedicated hardware can be used to compute the bit-array operations, for example using FPGAs or others, liberating the main processor from carrying out low-level tasks and dedicating its power to dispatch bit-array manipulation instructions.

S34. Operating Bit-Arrays

Figure 8:
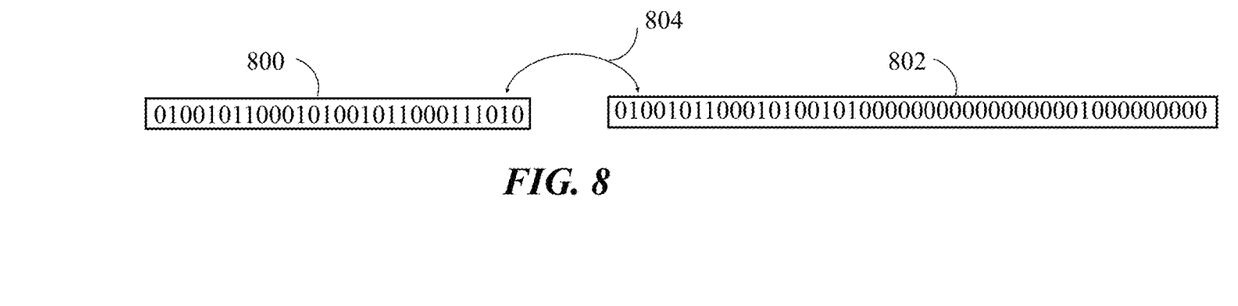
FIG. 8 depicts how graph transformations can be efficiently performed in the computer memory as array-wide bitwise boolean operations.

Referring to FIG. 8, bit-arrays can be stored or operated in compressed 800 or uncompressed 802 formats. Compression for bit-arrays should be lossless. Since bit-arrays involved in the calculation of semantic embeddings are usually large and often very sparse, containing mostly zeros, compression is possible and recommendable. Various compressions are possible. The simplest compression that works consists in replacing a sequence of consecutive zeros in memory by a sequence of bits representing a count of the number of zeros. This approach, albeit simple, is usually enough to reduce the amount of memory used by the machine learning method by a factor of 10 or even by a factor of 100 depending on the problem. Transforming 804 between the compressed and uncompressed formats is a valid approach. Alternatively, it is also possible to carry out logical AND, OR and NOT operations while keeping the bit-arrays compressed at all times. Operating bit-arrays in compressed format involves moving along the input bit-arrays, decompressing sections of the bit arrays, operating the sections bitwise and compressing the resulting array of bits until the end of the input bit-arrays is reached. Storing bit-arrays in compressed formats reduce the transfer bandwidth between RAM memory and the processors which, also, can improve performance in memory intensive methods as the one proposed in this patent.

S35. Calculating Lower Atomic Segments

To exemplify the use of array-wide bitwise operations, consider again the calculation of useful output values discussed in [S16. Querying the Algebraic Output model] that require calculating "lower atomic segments". An array-wide bitwise OR operation 706 can be used to calculate the lower atomic segment of a term that has no node in the output graph, i.e. the directed graph of the algebraic output model 110 and is mentioned in a query relation 108. This lower atomic segment can be calculated by operating the children's' bit-arrays of the nodes of the component constants of the term, applying a bitwise OR on as many bit-arrays as component constants the term has. Each OR bitwise operation resembles the operation between bit-arrays 700 and 702 in FIG. 7. The lower atomic segment of an algebraic element that has a node in the output graph 110 directly corresponds with the children's bit-array 604 associated to the node. Bitwise operations over bit-arrays are also used to associate a binary output value, positive or negative, to the query relations 108. For example, to compute the value of relation (a, b), first, we calculate the lower atomic segments of nodes a and node b, operate both with a bitwise AND operation and return "positive" if the resulting value equal to b and "negative" if it is different. A positive result establishes that a<b holds in the algebra. The value of query relations is calculated in this manner and is valid only when the output graph represented the algebra is transitively closed.

S36. Calculating Outputs For Queries

Figure 9:
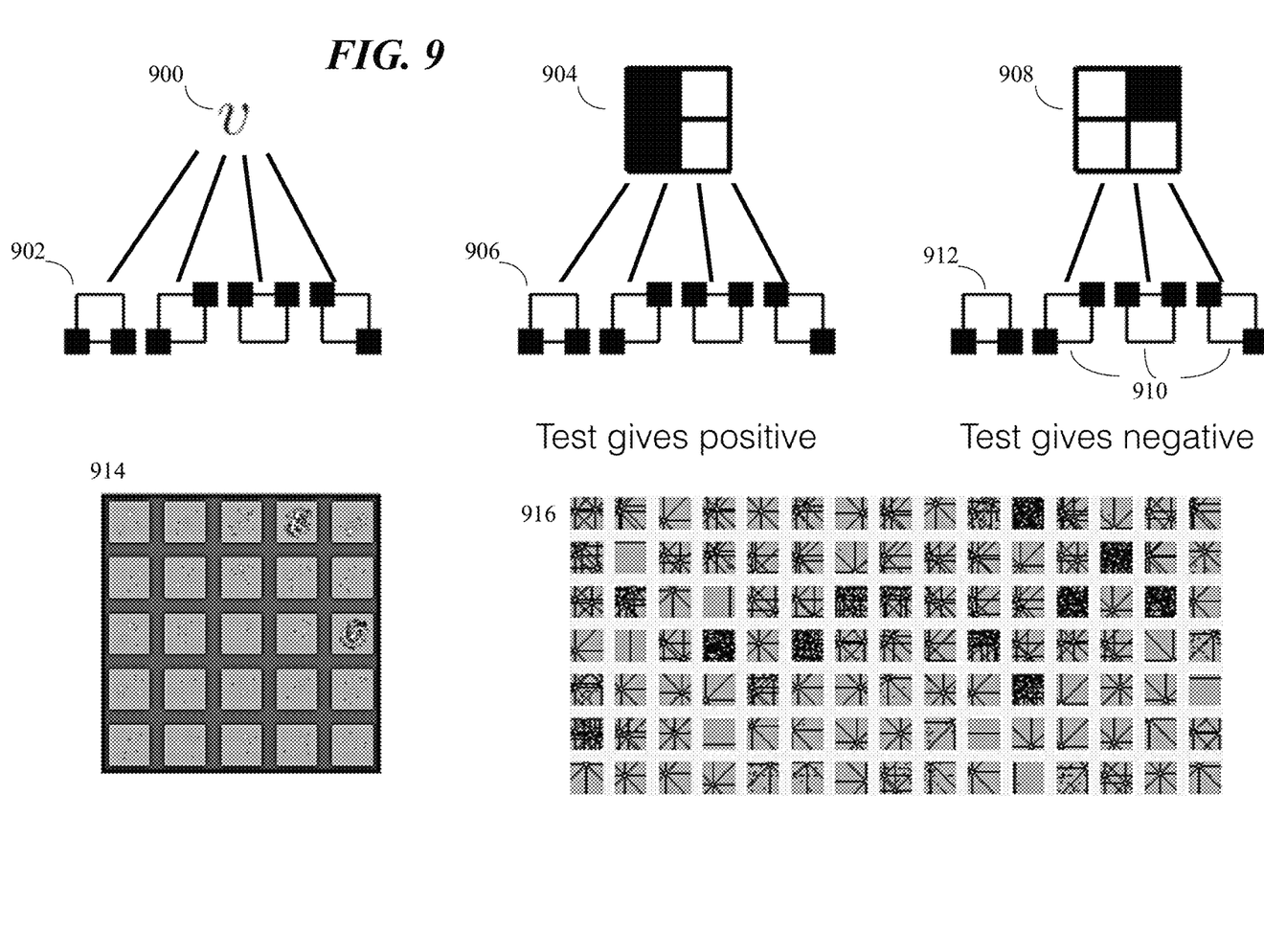
FIG. 9 depicts how to make a query to the algebraic output model and respond it using the irreducible components. The figure also shows examples of irreducible components for various problems.
Figure 10:
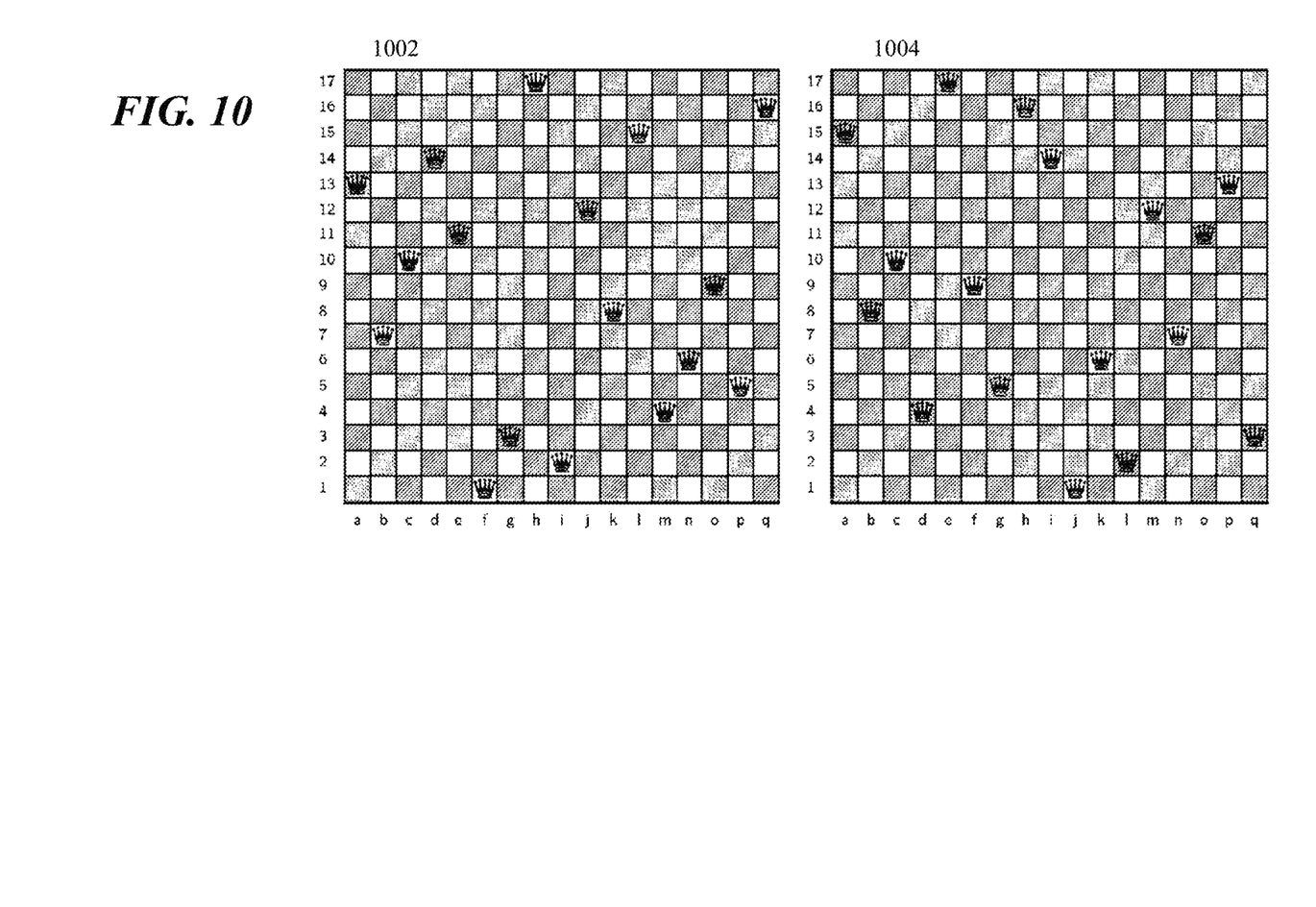
FIG. 10 depicts two complete boards found by the system.

Referring to FIG. 9, examples of atoms associated with indecomposable components of the algebraic output model 110, for several learning tasks. For the 2×2 grid example problem in FIG. 3, in which the positive examples all contain a black vertical bar, the algebraic semantic embedding finds that the constant v, 900, that represents the property that the positive examples have in common, is associated with the 4 atoms in 902. These atoms can be used to query whether a test example belongs to the positive class, as explained in [S16. Querying the Algebraic Output model]. A 2×2 test example image 904 is declared positive when the atoms in v are contained in the atoms of the lower atomic segment associated with the term of the test example image 906. A test image 908 is declared negative when one or more of the atoms in v are not contained in the atoms of the lower atomic segment of the test image. In the top-right of FIG. 9, the atom 912 is an atom of v that is not in the lower atomic segment of test image 908, therefore declaring 908 "negative" for the property v, despite containing atoms 910. For the practical scenario of handwritten digit recognition, atoms associated to digits are each related to constants that represent black and white pixels in a 28×28 grid, illustrated here with the atoms 914 learned for the task of identifying digit 5. Atoms learned for the task of finding a configuration of queens that do not attack each other for a 17×17 board are given in 916. Two complete boards found by the system are shown in 1002 and 1004 of FIG. 10. This task is resolved by the algebraic semantic embedding by providing as input formal knowledge of the board, that comprises how queens attack each other as well as the desired properties of a valid solution.

The invention claimed is:

1. A method for distributed machine learning from input data comprising formal knowledge and/or training data, the distributed machine learning in one or many computing devices, the computing devices referring to computing machines and/or computing threads in one or many computing machines, the computing devices each working in the same or related learning tasks, the method for distributed machine learning consisting of:

independently calculating in each computing device an algebraic output model, the algebraic output model corresponding with a discrete algebraic model of the input data that is also an algebraic model of an algebra with at least one idempotent operator:

sharing among the computing devices indecomposable components of the calculated algebraic output models, the sharing, without the need to synchronize the computing devices, the sharing without constraints on when or on how many times the sharing needs to happen, the computing devices without the need to wait or interrupt ongoing calculations due to the reception of the sharing from other computing devices and without the obligation to use the sharing every time the sharing is received;

recalculating on each computing device its algebraic output model to process new input data and/or to process the sharing from itself or other computing devices, said recalculating optional and delayable until ongoing calculations are completed; and the computation of the algebraic output model and the sharing iterated in one or many computing devices in an open-ended manner or until a learning performance criterion is met, thereby providing a solution to scale-up distributed machine learning systems.

2. The method for the distributed machine learning of claim 1 wherein the independent calculation in each computing device of the algebraic output model comprises:

taking a set of input order relations and producing therefrom the algebraic output model that is a discrete algebraic model of an algebra with at least one idempotent operator and that is also an algebraic model of the input order relations;

the algebraic output model explicitly in the form of a direct product of directly indecomposable components:

the algebraic output model calculated so as to minimize the number of indecomposable components;

from the set of input order relations, each input order relation corresponding with an ordered pair of algebraic elements;

the input order relations taking each a value in a Boolean algebra;

the algebraic elements either equal to primitive elements or obtained by operating primitive elements using the operators of the algebra with at least one idempotent operator;

the primitive elements corresponding to names provided by the user of the machine learning method to refer to items in the input data;

the input order relations collectively defining one or many consistent input partial orders in the set of algebraic elements;

the idempotent operator defining an output partial order in the algebraic output model by the well-known correspondence between idempotent operators and partial orders:

the output partial order extending at least one of the consistent input partial orders; and the output partial order providing answers to user's queries hereby providing useful machine learning output.

3. A method for the distributed machine learning that uses input data consisting of formal knowledge and/or training data, the method for the distributed machine learning using a multiplicity of computing devices that operate independently and communicate without the need to synchronize, the computing devices referring to computing machines and/or computing threads in one or many computing machines, the machine learning method comprising the steps of:

(a) one or many users encoding training data, formal knowledge or both, the training data including examples of at least one category to be learned, the formal knowledge including relationships in the input data and constraints imposed by the one or many users on the algebraic output model, the encoding in the form of a set of input order relations and a set of input algebraic elements, the input order relations corresponding each with an ordered pair of algebraic elements from the set of input algebraic elements, the input order relations having each two possible values, the algebraic elements in the set of input algebraic elements corresponding each either with a primitive element or obtained by operating primitive elements using the operators of an algebra with at least one idempotent operator, the primitive elements corresponding to names given by the user to entities in the input data, the input order relations collectively defining a consistent input partial order in the set of algebraic elements; and (b) feeding the set of input order relations and the set of input algebraic elements to the multiplicity of computing devices, each computing device fed with the same or a different set of input order relations and the same or a different set of input algebraic elements than the other computing devices, and generating a directed graph from the set of input algebraic elements in each computing device, the directed graph having at least one node for each input algebraic element in the set of input algebraic elements, the directed graph having directed edges to represent the explicit construction of input algebraic elements by idempotent summation of other input algebraic elements, the directed graph extended with additional edges to make the directed graph transitively closed;

(c) transforming the directed graph in each computing device using a series of intermediate graph transformations, each intermediate graph transformation including creating or deleting indecomposable components of an algebra with at least one idempotent operator, each component represented using at least one node of the directed graph, each intermediate graph transformation aimed to enforce at least one input order relation without affecting the already enforced input order relations, said transforming carried out until the graph represents an algebraic model that satisfies all the input order relations, thereby providing an algebraic output model that is discrete and corresponds with an algebraic model of the input data itself and also with an algebraic model of the algebra with at least one idempotent operator, the idempotent operator defining an output partial order in the algebraic output model by the well-known correspondence between idempotent operators and partial orders, said output partial order extending the consistent input partial order, the algebraic output model explicitly in the form of a direct product of directly indecomposable components, the algebraic output model calculated doing a best effort to obtain as few indecomposable components as possible;

(d) calculating in each computing device a set of derived order relations, the calculation using the indecomposable components of the algebraic output model calculated in the device, the set of derived order relations collectively defining the indecomposable components, the derived order relations in the set consisting each of an ordered pair of algebraic elements;

(e) for each computing device in the multiplicity of computing devices, make available to other computing devices derived order relations from the set of derived order relations so the other computing devices and the computing device itself can use some or all of the made-available derived order relations as if they were additional input order relations, the made-available derived order relations provided as asynchronous output from the computing device to the other computing devices;

(f) obtain useful machine learning output by using one or many queries and one or many algebraic output models, the one or many algebraic output models satisfying each the input order relations and all or some of the derived order relations, the one or many queries each with the form of an ordered pair of algebraic elements and the result of the query corresponding with the relative order of said algebraic elements in an algebraic output model, said relative order consistent with the output partial order of the algebraic output model; and (g) returning to step (b) either when additional input order relations are available or to produce a different algebraic output model.

4. The method for the distributed machine learning of claim 2 wherein:

the sharing of indecomposable components of the algebraic output models occurs in the form of a sharing derived order relations;

the derived order relations calculated each from one indecomposable component of the algebraic output model;

the derived order relations collectively and algebraically defining all or some of the indecomposable components; and the derived order relations consisting each of an ordered pair of algebraic elements of the algebra with at least one idempotent operator.

5. The method for the distributed machine learning of claim 2 wherein the algebraic output models are calculated one after another in various computing devices or a single computing device.

6. The method for the distributed machine learning of claim 2 wherein the distributed machine learning uses one or many previously existing sets of derived order relations calculated in other distributed machine learning systems.

7. The method for the distributed machine learning of claim 3 wherein the distributed machine learning uses one or many previously existing sets of derived order relations calculated in other distributed machine learning systems.

8. The method for the distributed machine learning of claim 2 wherein the algebraic output models are represented within the memory or circuitry of the computing devices using a collection of bit-arrays, and the computation of the algebraic output models use array-wide bitwise operators OR, AND,. and NOT operating over the bit-arrays.

9. The method for the distributed machine learning of claim 3 wherein the algebraic output models are represented within the memory or circuitry of the computing devices using a collection of bit-arrays, and the computation of the algebraic output models use array-wide bitwise operators OR, AND,. and NOT operating over the bit-arrays.

10. The method for the distributed machine learning of claim 1 wherein the input order relations for different computing devices sharing indecomposable components is provided by different users.

11. The method for the distributed machine learning of claim 2 wherein the input order relations and the user's queries for different computing devices sharing indecomposable components is provided by different users.

12. The method for the distributed machine learning of claim 2 wherein the indecomposable components are shared over the internet.

13. The method for the distributed machine learning of claim 3 wherein the indecomposable components or the derived order relations are shared over the internet.

* * * * *